Jan. 16, 1951    G. M. JONES    2,538,567
VESSEL FOR PRESSURE COOKING
Filed Jan. 3, 1947    2 Sheets-Sheet 1
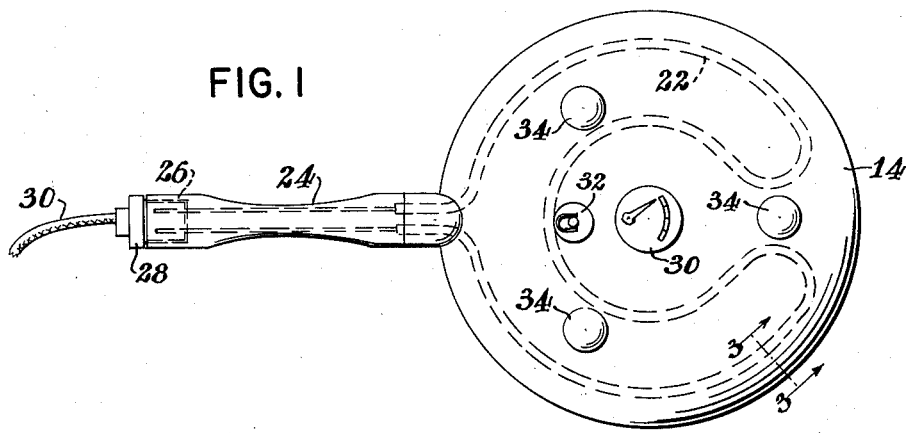
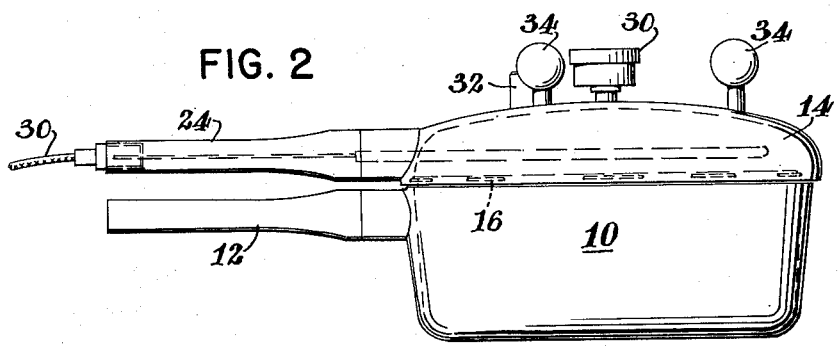
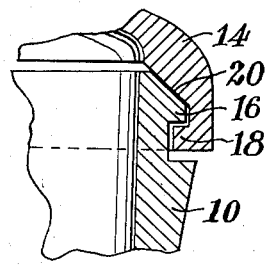
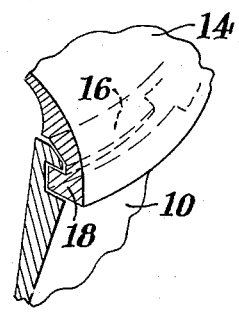
Inventor:
George M. Jones
By Homer R. Montague
Attorney

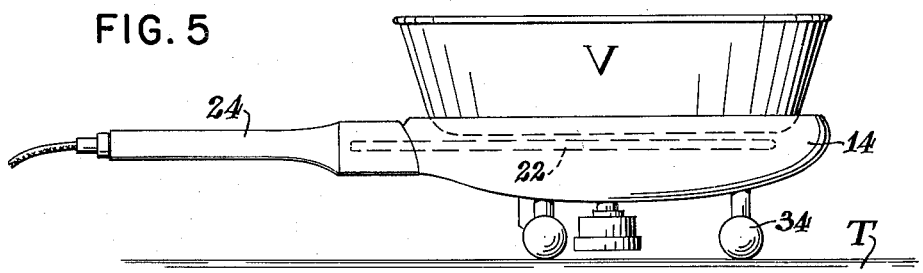
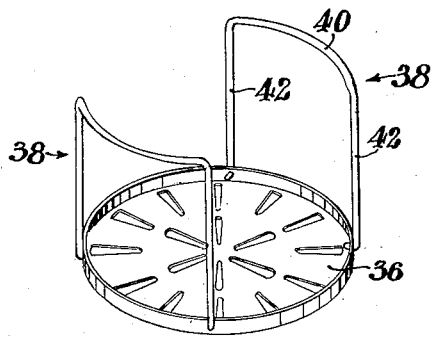
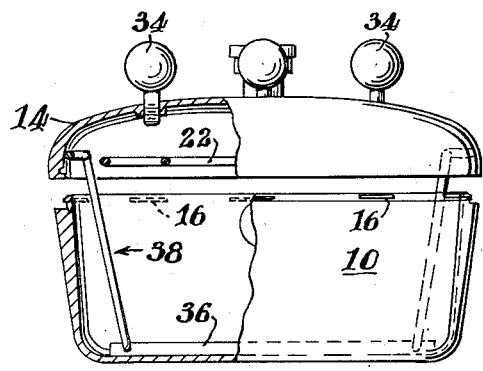

Patented Jan. 16, 1951

2,538,567

UNITED STATES PATENT OFFICE 2,538,567

VESSEL FOR PRESSURE COOKING

George M. Jones, Salt Lake City, Utah

Application January 3, 1947, Serial No. 719,965

1 Claim. (Cl. 219—44)

This invention pertains to cooking devices of the general type known as pressure-cookers. In particular, the invention is concerned with cookers of the type which are adapted to expose foodstuffs to a combination of pressure and radiant heat, as disclosed in my prior application Serial No. 685,732 filed July 23, 1946. The present invention is concerned with certain improvements in cookers of the type covered by said application, to increase the utility of such a device and enable its use for a wider variety of cooking operations than can be accomplished with the previous design.

It is an object of this invention to provide a cooking vessel of the type indicated and which is adapted for top-of-stove use, whereby a part at least of the energy required may be derived from the burners, heating elements or the like of an ordinary range of whatever type, yet which enables the combination of heat, pressure and direct radiant energy to be applied as disclosed in my prior application referred to above. A further object is to provide such a utensil in which the parts may be used not only in combination, but also separately, thus greatly increasing the value of the article to the user. Also, the device may be used as an open broiler where desired, by virtue of accessories to be described below.

A still further object is to provide a vessel of this class in which the portion containing the radiant heat producing element is adapted for separate use as an ordinary table stove or hotplate, and in which the remainder of the device is adapted for separate use as an ordinary pot or vessel for stewing, frying or other cooking in the usual manner.

Still another object of the invention is to provide a vessel of the type indicated with means whereby the parts of the vessel may be assembled for use as a pot or pan and its corresponding lid, but without the pressure-cooker feature where pressure-cooking is not desired. Also, of course, the utensil may be used as an ordinary pressure-cooker merely by omitting to energize the radiant heating element.

The above and other objects and advantages of the invention will best be understood by referring to the following detailed description of a preferred embodiment thereof, taken in connection with the accompanying drawings, in which Fig. 1 is a plan view of a pressure-cooker in accordance with the invention, Fig. 2 is a side elevational view thereof.

Fig. 3 is a fragmentary sectional view taken on the line 3—3 of Fig. 1,

Fig. 4 is a partial perspective view illustrating the manner of engagement of the pressure-sealing parts, Fig. 5 is a view illustrating the use of the lid of the device as a table stove or hot-plate, Fig. 6 is a perspective view of a trivet useful with the device of the preceding figures, together with auxiliary lid-supporting members, and Fig. 7 is an end elevational view, partly broken away, of the use of the device of Fig. 6.

In my prior application referred to above, I disclosed and claimed a cooking utensil adapted for the cooking of foodstuffs under pressure developed by the application of radiant heat from elements located entirely within the vessel. I have found that certain operating economies can be effected, and the flexibility of the device greatly enhanced, by so arranging the parts of the pressure vessel so that the device may be heated upon the top of an ordinary stove, either before or during the application of direct radiant heat to the contents, or both. To this end, the food-containing portion of the device may be designed as a more or less conventional pan, as in a conventional pressure-cooker, and used in combination with a pressure-tight lid containing the radiant heating facilities. As will appear, such a rearrangement of the parts provides not only for the economical utilization of stove heat in the operation of the device, but makes the major components of the new device quite useful in ways not possible with the device of the prior application.

Referring now to Figures 1 and 2 of the drawings, there is shown a pressure-cooking vessel comprising a bottom unit 10 in the shape of an ordinary stewing pot and provided with a handle 12 which may be of wood, plastic or other heat insulating material, or of metal treated or covered to render it insulating. A top or lid unit 14 is arranged for removable pressure-tight connection with portion 10 by any suitable means. As best shown in Figs. 3 and 4, such connection may comprise a series of lugs 16 extending outwardly from the upper periphery of unit 10, the under surface of each lug 16 tapering as indicated in Fig. 4, and adapted to be engaged by corresponding lugs 18 on lid unit 14. The bevelled surfaces of the parts 10 and 14, which are continuous around the peripheries of these parts, are ground so as to engage one another in a pressure-tight manner as indicated at 20, upon rotation of the lid with respect to the bottom unit.

It will be understood that any equivalent pressure-tight connection may be employed in place of that shown.

Lid portion 14 has mounted therein, by any suitable means, a radiant heating coil 22 in the form of a rod of electrically resistive material. Electrical connections to the heating coil 22 may pass through the handle 24 of the lid portion 14, and may terminate in a socket or receptacle 26 at the extremity of handle 24, adapted to receive a plug 28 wired to an electric supply cord 30. The material and general construction of handle 24 may be otherwise similar to the handle 12 of the bottom portion 10. Mounted upon the lid portion 14, for communication with the interior of the closed vessel, are a pressure gauge 30 and a usual form of valve 32, the latter of which may combine the functions of a safety valve and of a manually operated relief valve for releasing the internal pressure prior to opening of the vessel.

Mounted upon the lid portion 14 are a plurality, here three, of heat insulating legs 34 shown as terminating in spherical members adapted to support the lid in inverted position upon a table T or the like, as shown in Fig. 5, for use as a table stove or hot plate, heating coil 22 providing a source of energy for this portion when so used. A vessel V is shown in Fig. 5 to illustrate this use of the device. It will be understood that the height of the three legs is such as to provide clearance for the gauge 30 and valve 32; the legs 34 may be made of plastic or any equivalent (preferably heat-insulating) material to protect the surface of table T (Fig. 5) against marring and the effects of conducted heat.

Coil 22 may be secured in lid 14 in any desired way, as by separate supports, or by being embedded in a suitable ceramic material, or in any equivalent manner. The vessel portion 10 and the lid 14 may be constructed of cast iron, cast or drawn aluminum, or any of the materials of which pressure-cookers are generally made, and it will be understood that the electrical leads through handle 24 are suitably sealed in a pressure-tight manner, as by packing, casting or molding in place in the plastic material, or the equivalent.

In Fig. 6 is illustrated a trivet or support plate 36 shown as a perforated plate of metal adapted to lie upon the bottom of the cooker (either in the position shown or inverted therefrom) to facilitate drainage from the food, to eliminate any possibility of burning contact with the bottom, or to enable easier cleaning. As shown in Fig. 6, the trivet plate may be provided with a pair of removable wire supports 38 whose bent lower ends may, for example, merely enter apertures in the rim of the plate 36. Each of elements 38 is provided with a curved central portion 40 connecting its legs 42 and adapted to support the lid portion 14 spaced somewhat above the top of the bottom unit 10, as shown in Fig. 7, when it is desired to use the utensils without the pressure feature. It will be understood that portions 40 engage the inside surfaces of lid portion 14, while the side legs 42 lean against the inside top edge of the bottom unit or vessel 10, the lengths of legs 42 being such that a small space is provided between the main units as above described. Elements 38, being readily removable, thus provide at an extremely low cost a feature which considerably increases the utility and flexibility of the utensil; namely, the use of the radiant heater for open vessel broiling without pressure cooking.

A few examples of the use of the device in the preparation of foodstuffs will now be given. For the preparation of Southern fried chicken, the body 10 of the cooker is first placed on a stove and preheated just as would be done with a frying pan, the operation requiring approximately four minutes. The chicken is then placed in the cooker, the lid 14 secured in pressure sealing position, and the cooking carried out under pressure resulting from the stove heat for about four minutes. The radiant heating coil 22 is now energized, as by connecting plug 28 to socket 26, and the cooking is continued, using both stove heat and radiant heat coil 22, for about four additional minutes. The chicken is then done and browned. Browning of the top is produced by the radiant heating coil 22, and the bottom is at least partially browned by the ordinary frying action resulting from the heat of the stove.

To cook a one-half inch steak rare, the body 10 of the cooker is preheated as above, the steak is placed in the cooker and the lid 14 is applied and sealed. The radiant heat coil 22 is turned on immediately, and the steak will be done and browned within three to four minutes. This contrasts with eight to ten minutes time required in the usual frying pan process, without the added benefit of radiant heat browning.

Pork chops which would require twenty-five to thirty minutes in an ordinary frying pan will be well done and browned within eight to ten minutes by following the procedure just outlined for steak.

For the preparation of stew, pot roasts, potted beef and the like, the device is used as an ordinary pressure-cooker for fifteen to twenty minutes, and the radiant heat is turned on for a short period at the end of the operation for the purpose of browning the upper surfaces.

From the above description and examples, it will be seen that I have satisfied all of the objects of the invention, by providing a device which accomplishes the desired combination of pressure-cooking with the simultaneous and direct application of radiant heat to the material being prepared, and which is also adaptable to numerous other uses in the cooking field. These objects have been attained with a minimum of complexity and cost in the device itself, and its use is extremely simple. Obviously many changes and modifications may be made in the design shown without departing from the spirit of the invention, and I therefore wish to include within my invention all such changes as come within the scope of the appended claim.

I claim:

In a pressure-cooker, a substantially flat-bottomed vessel adapted to contain a foodstuff, a relatively shallow cover member for said vessel recessed to provide an open face, cooperating formations on said vessel and said cover member adapted to secure them together in a pressure-tight manner, an electrical resistance radiant heating element in said cover member lying substantially in a plane parallel to and adjacent the plane of said open face so as to expose the contents of said vessel to radiant heat when said cover member is secured to said vessel by said formations, and heat insulating legs carried by said cover member on the surface opposite its open face for supporting the same upon a generally flat horizontal surface with said heating element facing up, said heating element being rigid and self-supporting to receive and support a cooking receptacle thereupon when said cover member is supported by said legs.

GEORGE M. JONES.

REFERENCES CITED

The following references are of record in the file of this patent:

UNITED STATES PATENTS

| Number | Name | Date |
|---|---|---|
| 1,630,237 | Smith | May 24, 1927 |
| 1,946,220 | Lotz | Feb. 6, 1934 |
| 1,969,878 | Dumas | Aug. 14, 1934 |
| 2,148,822 | Kolouch | Feb. 28, 1939 |
| 2,183,866 | Hutchens et al. | Dec. 19, 1939 |
| 2,308,603 | Graham | Jan. 19, 1943 |
| 2,339,974 | Austin | Jan. 25, 1944 |
| 2,378,950 | Reich | June 26, 1945 |